US008134752B2

(12) United States Patent
Tanaka

(10) Patent No.: US 8,134,752 B2
(45) Date of Patent: Mar. 13, 2012

(54) IMAGE FORMING APPARATUS

(75) Inventor: Kunihiko Tanaka, Osaka (JP)

(73) Assignee: Kyocera Mita Corporation (JP)

( * ) Notice: Subject to any disclaimer, the term of this patent is extended or adjusted under 35 U.S.C. 154(b) by 821 days.

(21) Appl. No.: 12/203,175

(22) Filed: Sep. 3, 2008

(65) Prior Publication Data

US 2009/0059308 A1      Mar. 5, 2009

(30) Foreign Application Priority Data

Sep. 4, 2007    (JP) ................................. 2007-229003

(51) Int. Cl.
*B41C 1/04* (2006.01)
(52) U.S. Cl. ..................... 358/3.29; 358/1.12; 358/1.14; 358/1.15; 358/3.11; 358/3.12
(58) Field of Classification Search ................. 358/3.29, 358/1.15, 1.14
See application file for complete search history.

(56) References Cited

U.S. PATENT DOCUMENTS

| 7,847,980 B2* | 12/2010 | Aritomi et al. | 358/3.28 |
| 2005/0078331 A1 | 4/2005 | Guan et al. | |
| 2005/0219599 A1* | 10/2005 | White et al. | 358/1.14 |
| 2006/0268311 A1* | 11/2006 | Tamaru | 358/1.14 |
| 2007/0091350 A1* | 4/2007 | Aritomi et al. | 358/1.14 |

FOREIGN PATENT DOCUMENTS

| JP | 2004-274092 | 9/2004 |
| JP | 2005-115874 | 4/2005 |

* cited by examiner

*Primary Examiner* — Charlotte M Baker
*Assistant Examiner* — Aaron R Gerger
(74) *Attorney, Agent, or Firm* — Gerald E. Hespos; Michael J. Porco

(57) ABSTRACT

An image forming apparatus includes a determining section for determining if a value indicative of a size of the background portion in the background pattern is smaller than a predetermined threshold value; and a background pattern correcting section which corrects the background portion and the latent image portion, when the determining section determines that the value is smaller than the threshold value, so that the value indicative of the size of the background portion becomes equal to or larger than the threshold value, and which forms a background pattern having a corrected background portion in which a copy prohibiting pattern is embedded, wherein the image forming section forms on a sheet the background pattern when the determining section determines that the value is smaller than the threshold value, and forms on the sheet the background pattern when the value is equal to or larger than the threshold value.

7 Claims, 5 Drawing Sheets

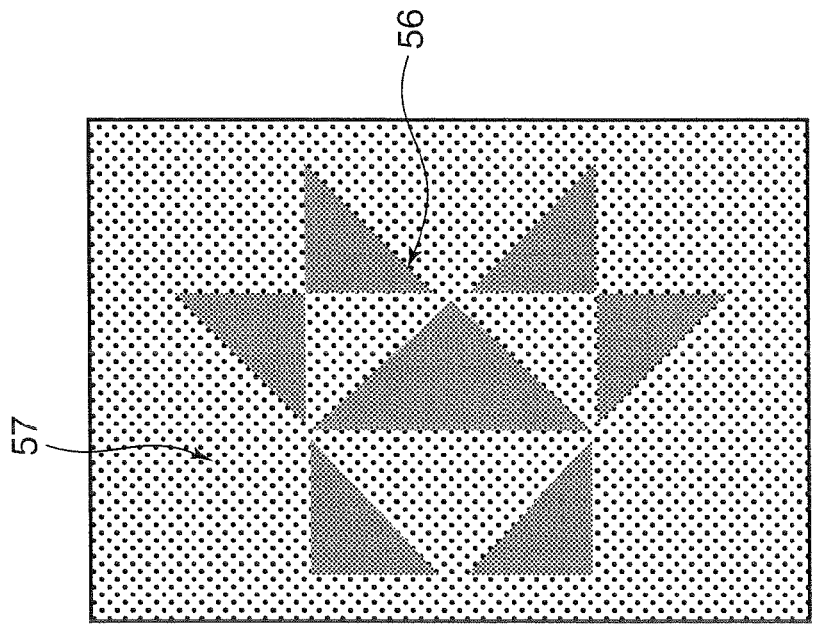
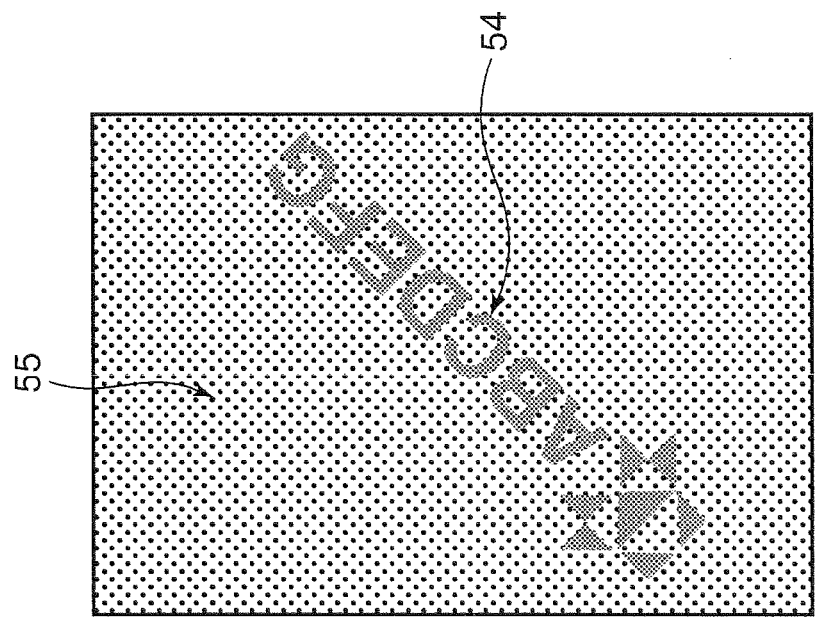
FIG. 3A
FIG. 3B

IMAGE FORMING APPARATUS

BACKGROUND OF THE INVENTION

1. Field of the Invention

The present invention relates to an image forming apparatus for forming a document having formed thereon a background pattern which includes a copy prohibiting pattern for preventing an unfair copying.

2. Description of the Related Art

Conventionally, various techniques have been proposed for preventing or repressing copying or reproduction of a confidential document or a use of a copy of such document, which includes, for example, company's information to be kept secret. Examples of the foregoing conventional techniques include a technique for embedding into a document image a background pattern made up of a background portion formed with a screen ruling and a latent image portion formed with a screen ruling which is higher (higher dot density) than that of the background portion (hereinafter referred to as background pattern print technique). When copying a document image formed by the foregoing background pattern print technique, an outlined pattern such as "copy prohibited" appears on the copy in an area corresponding to the latent image portion of the document image.

Japanese Patent Unexamined Publication No. 2005-115874 (Published on Apr. 28, 2005) discloses such background pattern print technique wherein an image to be appeared on a copy when copying a document can be set as desired by inputting an image file for an image which represents an arbitrary shape such as a logo.

Another well known conventional technique for preventing an unfair copying is disclosed, for example, in Japanese Patent Unexamined Publication No. 2004-274092 (Published on Sep. 30, 2004; Corresponding US Patent Application Publication No. 2005/0078331 (Published on Apr. 14, 2005)), wherein a special dot pattern embedded into a background image of the image data obtained by reading a document image is detected, and as a result of comparing the special dot pattern as detected with a special dot pattern as stored in memory, if the special dot pattern matches the one stored in the memory, an image forming operation of the document image is prohibited (hereinafter, this technique is referred to as a copy guard technique).

In recent years, a technique which combines the foregoing background pattern print technique with the copy guard technique (hereinafter, referred to as a hybrid background pattern print technique) has been proposed, wherein a special dot pattern for use in the copy guard function is formed in a background portion. With this structure, when an attempt is made to copy a document prepared by using the foregoing hybrid background pattern print technique by a copying machine which is provided with the function of detecting a special dot pattern, it is possible to prevent an unfair copying of the document. Furthermore, even when an attempt is made to copy the document prepared by using the hybrid background pattern print technique by a copying machine which is not provided with the function of detecting a special dot pattern, since the pattern would appear on a copy, it is possible to expect such effect that an operator refrains from performing an unfair copying or a use of the copy.

When adopting the foregoing hybrid background pattern print technique, it is possible to realize a more desirable image forming apparatus by arranging a pattern to be appeared on a copy can be set as desired. However, the following points should be taken into consideration.

That is, as described above, the background portion is formed with a screen ruling and includes dots which can be resolved by a reading operation of a normal (having an average reading accuracy) image forming apparatus. On the other hand, the latent image portion is formed with a screen ruling which has a screen ruling higher than the screen ruling of the background portion and includes fine dots which cannot be resolved by a reading operation performed by a normal image forming apparatus.

Since the special dot pattern needs to be resolved by an image forming apparatus, it is necessary to form the special dot pattern on the background portion. However, if an area of the background portion in the document is relatively small, the special dot pattern cannot be formed under stable conditions.

Specifically, in an image forming apparatus wherein a special dot pattern presents a certain pattern, if an area of the background portion is relatively small, the pattern may be lacked partially. Further, some image forming apparatuses are arranged such that a predetermined number of special dot patterns are formed in a background portion of a document, and a copy guard function becomes effective only after detecting a predetermined number of dot patterns out of the dot patterns formed on the document. With this structure, if an area of the background portion is relatively small, there may not have enough space for forming the predetermined number of dot patterns.

SUMMARY OF THE INVENTION

The present invention is achieved in finding a way to solve the foregoing problem associated with the conventional structure, and it is therefore an object of the present invention to provide an image forming apparatus which is capable of setting an arbitrary background pattern to be formed on a sheet while surely forming a copy prohibiting pattern.

In order to achieve the foregoing object, an image forming apparatus according to one aspect of the present invention comprises: an image forming section for forming an image on a sheet; a data receiving section for receiving image data for use in forming a background pattern as inputted to the image forming apparatus; a background pattern forming section for forming a background pattern which includes a background portion formed with a first screen ruling and a latent image portion formed with a second screen ruling which is higher than the first screen ruling in accordance with the image data for use in forming the background pattern as received by the data receiving section, with a copy prohibiting pattern embedded in the background portion; a determining section for determining if a value indicative of a size of the background portion in the background pattern formed by the background pattern forming section is smaller than a predetermined threshold value; and a background pattern correcting section which corrects, when the determining section determines that the value indicative of the size of the background portion is smaller than the threshold value, the background portion and the latent image portion so that the value indicative of the size of the background portion becomes equal to or larger than the threshold value, and which forms a background pattern having a corrected background portion in which a copy prohibiting pattern is embedded, wherein the image forming section forms on a sheet the background pattern as formed by the background pattern correcting section when the determining section determines that the value indicative of the size of the background portion is smaller than the threshold value, and forms on the sheet the background pattern as formed by the background pattern forming section when the determining section determines that the value indicative of the size of the background portion is equal to or larger than the threshold value.

According to the foregoing structure, it is determined whether the value indicative of the size of the background portion in the background pattern as formed by the background pattern forming section is smaller than the predetermined threshold value. When it is determined that the value indicative of the size is smaller, the background portion and the latent image portion are corrected so that the value indicative of the size of the background portion becomes equal to or larger than the threshold value.

With this structure, it is possible to increase a size of the background portion in which a copy prohibiting pattern is to be embedded. As a result, for such copy prohibiting pattern representing a certain pattern, it is possible to prevent or reduce such problem that each pattern as formed is partially missing or a predetermined number of copy prohibiting patterns cannot be formed.

These and other objects, features and advantages of the present invention will become more apparent upon reading of the following detailed description along with the accompanied drawings.

BRIEF DESCRIPTION OF THE DRAWINGS

FIG. 3A shows an example of a background pattern when a background pattern data is formed as a background pattern on a sheet.

FIG. 3B shows an example of a background pattern when a background pattern data is formed as a background pattern on a sheet.

DETAILED DESCRIPTION OF THE PREFERRED EMBODIMENTS

Figure 1:
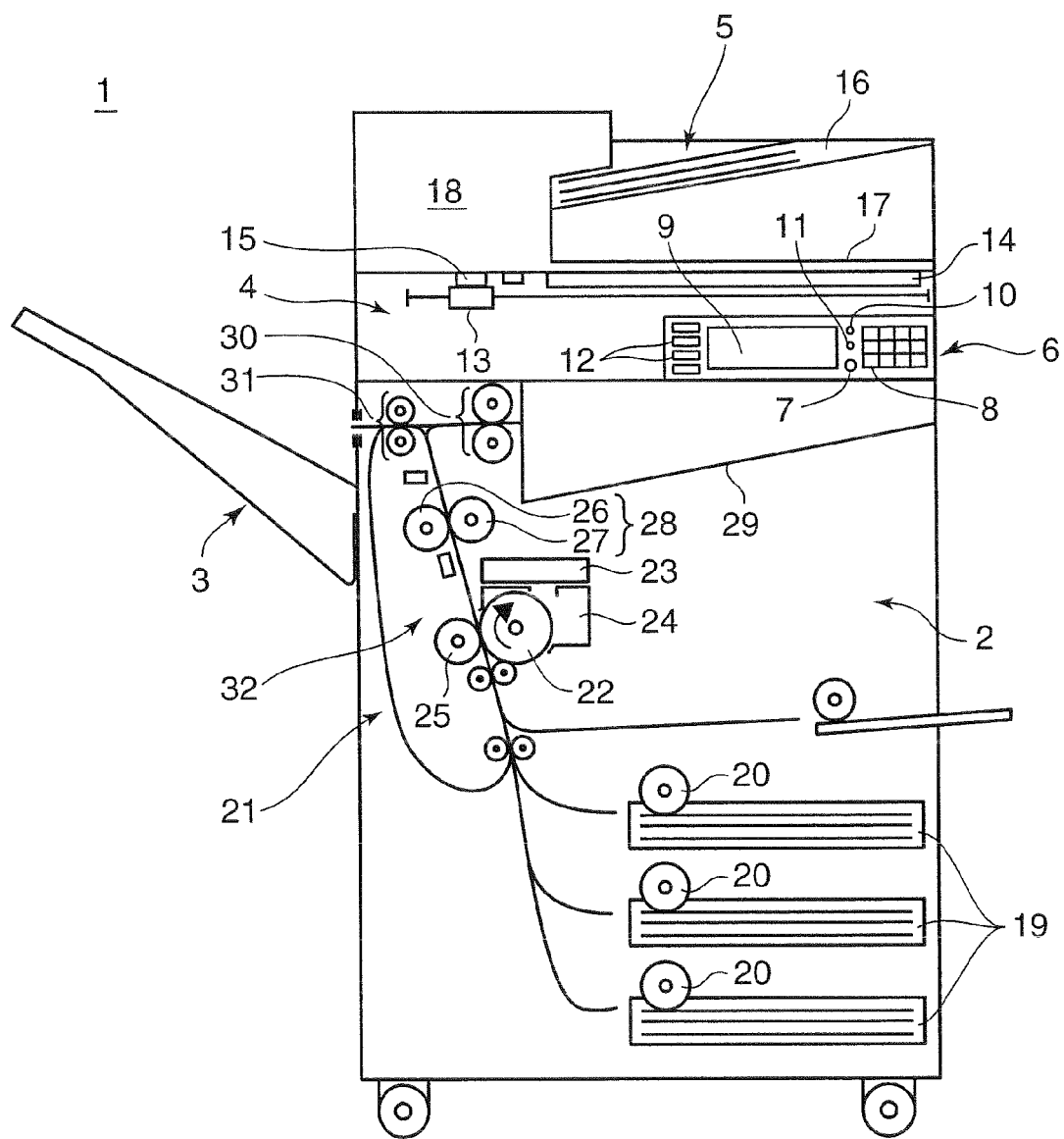
FIG. 1 is a side view schematically showing an internal configuration of a complex machine which is an example of an image forming apparatus in accordance with one embodiment of the present invention.

Hereinafter, an embodiment of an image forming apparatus in accordance with the present invention will be described with reference to the drawings. FIG. 1 is a side view schematically showing an internal configuration of a complex machine. The complex machine 1 has multi-functions including a copying function, a printer function, a scanner function, a facsimile function, and the like. The complex machine 1 is made up of a main body section 2, a stack tray 3 attached to the side face of the main body section 2 (on the left hand side in FIG. 1), a document reading section 4 on the main body section 2, and a document feeder 5 on the document reading section 4.

On a front section of the complex machine 1, an operating section 6 is provided. The operating section 6 includes a start key 7, numeric keys 8, a display section 9, a reset key 10, a stop key 11, and a function switch key 12. The start key 7 allows a user to input an instruction to execute a print operation. The numeric keys 8 allow a user to input, for example, a number of prints and the like. The display section 9 is made up of a liquid crystal display or the like, which has a touch panel function and allows a user to input various settings, and which displays operation guide information for various kinds of copying operations. The stop key 11 allows a user to terminate a print operation (image forming operation) which is being executed. The function switch key 12 allows a user to switch the function among the copying function, printer function, scanner function and the facsimile function.

The document reading section 4 includes a scanner section 13 which is made up of a CCD (Charge Coupled Device) sensor and an exposure lamp, a document platen 14 made of glass or other transparent material, and a document reading slit 15. The scanner section 13 is provided so as to be movable as being driven by a driving section (not shown). Specifically, when scanning a document placed on the document platen 14, the scanner section 13 is moved along the surface of the document at positions facing the document platen 14 and outputs to a controller 35 shown in FIG. 2, image data as obtained by scanning the document image. On the other hand, when scanning a document as being fed by the document feeder 5, the scanner section 13 is moved to a position facing a document reading slit 15, and the scanning section 13 obtains an image of the document through the document reading slit 15 in synchronization with a document transport operation by the document feeder 5, and outputs to the controller 35 the image data as obtained by scanning the document image.

The document feeder 5 includes a document holding section 16 for stacking thereon documents, a document discharge section 17 for discharging a document after having being scanned an image formed thereon, and a document transport mechanism 18. The document transport mechanism 18 includes feed rollers and transport rollers (not shown) for transporting the documents placed on the document holding section 16 one by one to the position facing the document reading slit 15 and discharge the sheets to the document discharge section 17. The document transport mechanism 18 also includes a sheet reversing mechanism (not shown) for reversing the document upside down and transporting the document again to the position facing the document reading slit 15 so that images formed on both sides of the document can be scanned by the scanner section 13 through the document reading slit 15.

Further, the document feeder 5 is rotatably provided with respect to the main body section 2 so that the front surface side thereof can be moved upwardly. By moving upwardly the front surface side of the document feeder 5 to open the upper surface of the document platen 14, an operator can place on the upper surface of the document platen 14, a document to be scanned, such as an opened book and the like.

The main body section 2 includes a plurality of feed cassettes 19, feed rollers 20 for transporting recording sheets one by one from the feed cassettes 19 to an image forming section 21, and the image forming section 21 for forming an image on a recording sheet as being transported from the feed cassette 19.

The image forming section 21 includes an optical unit 23, a developing section 24, a transfer section 25, a fixing section 28, and a pair of transport rollers 30 and 31, and the like. The optical unit 23 is provided for exposing a photosensitive drum 22 by emitting a laser light onto the surface of the photosensitive drum 22 based on image data as obtained by the scanner section 13. The developing section 24 is provided for forming a toner image on the surface of the photosensitive drum 22. The transfer section 25 is provided for transferring the toner image formed on the surface of the photosensitive drum 22 onto a recording sheet. The fixing section 28 includes a pair of rollers 26 and 27 for heating the recording sheet having the toner image transferred thereto so that the toner image can be permanently affixed thereto. The pair of transport rollers 30 and 31 is provided on the sheet transport path in the image forming section 21, for transporting the recording sheet to the stack tray 3 or to a discharge tray 29.

Further, in a case of forming images on both sides of the recording sheet, the image forming section 21 forms an image on one side of the recording sheet, and the recording sheet is then sandwiched between a pair of transport rollers 30 on the side of the discharging tray 29. The recording sheet is then switched back by reversing the pair of transfer roller 30, and is transported to the sheet transport path 32 to the upstream side in the image forming section 21. The image forming section 21 then forms an image on the other side of the recording sheet. The recording sheet is then discharged onto the stack tray 3 or the discharge tray 29.

Figure 2:
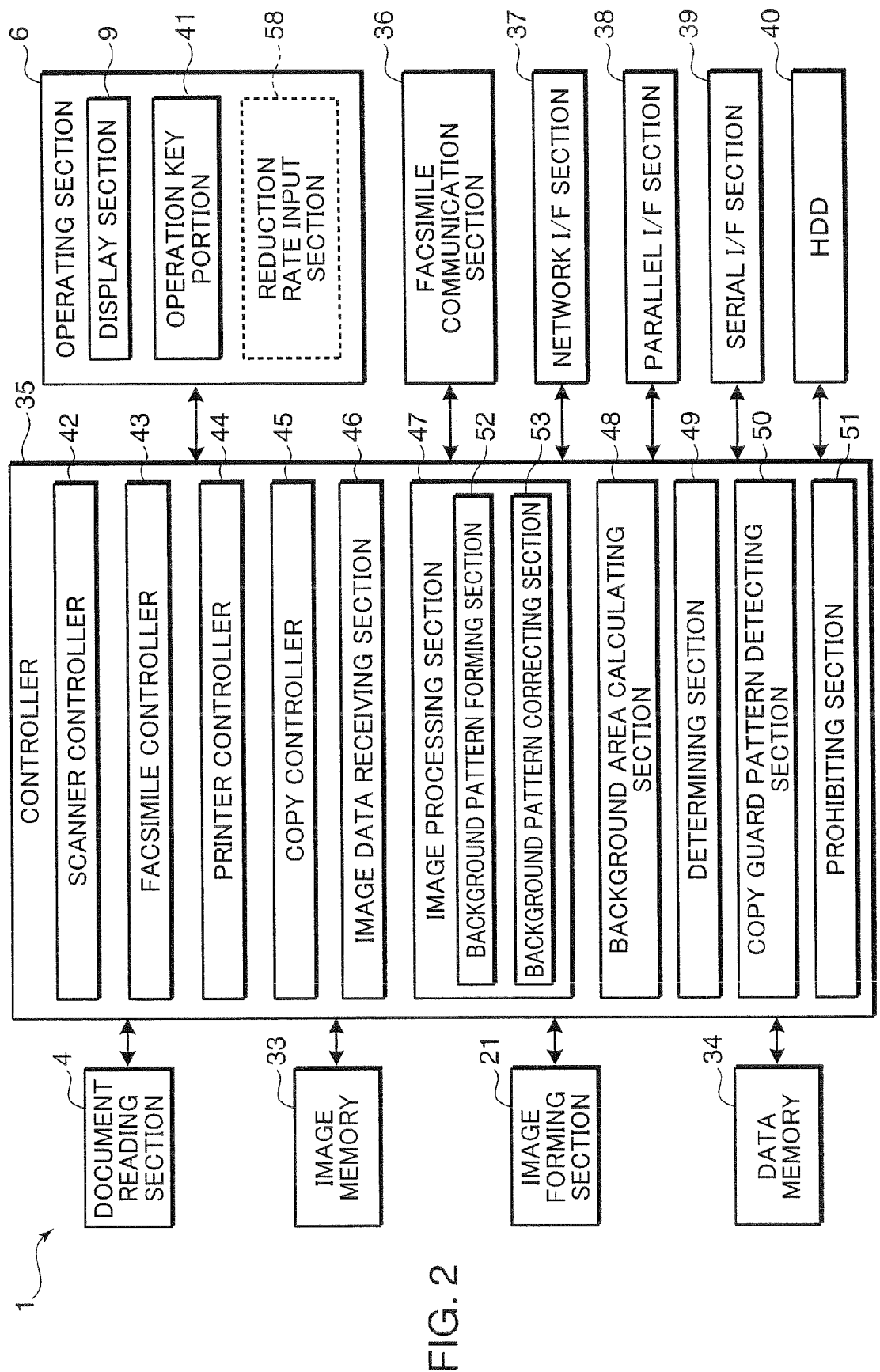
FIG. 2 is a block diagram showing an electrical structure of the complex machine.

Next, an electric structure of the complex machine 1 will be described. FIG. 2 is a block diagram showing an electric structure of the complex machine 1. As shown in FIG. 2, the complex machine 1 includes the document reading section 4, the image forming section 21, an image memory 33, a data memory 34, a controller 35, the operating section 6, a facsimile communication section 36, a network I/F section 37, a parallel I/F section 38, a serial I/F section 39, and an HDD (Hard Disk Drive) 40.

The document reading section 4, the data memory 34, the controller 35, the operating section 6, and the network I/F section 37 constitute a network scanner function for transmitting image data as obtained to a designated IP address. A facsimile function of the complex machine 1 is realized by the document reading section 4, the image forming section 21, the data memory 34, the controller 35, the operating section 6, and the facsimile communication section 36. A printer function is realized by the image forming section 21, the controller 35, the operating section 6, the network I/F section 37, and the parallel I/F section 38. Similarly, a copying function is realized by the document reading section 4, the image forming section 21, the controller 35, and the operating section 6.

The operating section 6 which corresponds to the one shown in FIG. 1 is provided for allowing a user to input instructions related to the copying function, the printer function, the facsimile function, the scanner function, and the like, and to be outputted to the controller 35. The operating section 6 is made up of the display section 9 including a touch panel and the like, and an operation key section 41 including the above-described start key 7, the numerical keys 8, and the like. The operation key section 41 is operated by a user to allow him/her to input various instructions such as an instruction to start a copying operation, an instruction to start a facsimile transmission, etc.

The document reading section 4 which corresponds to the one shown in FIG. 1 optically obtains a document image to form image data.

The image forming section 21 which corresponds to the one shown in FIG. 1 prints (forms) an image corresponding to image data of a document as read by the document reading section 4, image data received from an external computer or other external equipment via the network I/F section 37, and image data including fax data received by the facsimile communication section 36 from an external facsimile device onto a predetermined recording sheet.

The image memory 33 stores image data obtained by the reading operation of the document reading section 4, and image data processed by the controller 35 which will be described herebelow. The data memory 34 includes a storage device which stores names of receivers and facsimile numbers of receivers of a short-cut button registration to be used at a time of performing a facsimile communication. Further, the data memory 34 stores IP addresses of receivers for use as a network scanner.

The controller 35 includes peripheral devices such as a RAM (Random Access Memory) and a ROM (Read Only Memory) for storing a program for defining operations of the CPU, and a RAM for temporarily storing data in the CPU (Central Processing Unit) not shown. With this structure, the controller 35 controls overall operations of the complex machine 1 in accordance with instructions as inputted via the operating section 6 and the like, and detection signals as received from respective sensors provided in the complex machine 1. More particularly, the controller 35 serves as a scanner controller 42, a facsimile controller 43, a printer controller 44, and a copy controller 45.

The program which is read by a computer as the controller 35 for realizing the above-described functions may be stored in a nonvolatile and large-capacity external storage device such as an HDD 40 and transferred in an appropriate manner to a main storage device such as a RAM, so that the program can be executed by the CPU. The program may be provided through a computer-readable recording medium such as a ROM and a CD-ROM, or may be provided through a transmission medium such as a network connected to the network I/F section 37. The transmission medium is not intended to be limited to a wired transmission medium, and a wireless transmission medium may be adopted. Further, the transmission medium may include not only a communication line but also a relay device for relaying the communication line, for example, a communication link such as a router.

In the case of obtaining the program from the ROM, the program may be executed by the CPU by mounting to the controller 35, the ROM which stores therein the program. When the program is provided through a CD-ROM, it can be executed by the CPU by connecting a CD-ROM reading device to, for example, the parallel I/F section 38 and transferring the program to the RAM or the HDD 40. Further, when the program is provided through a transmission medium, it can be executed by the CPU by transferring the program received via the network I/F section 37 to the RAM or the HDD 40.

The scanner controller 42 is provided for controlling operations of members or sections which realize the scanner function. The facsimile controller 43 is provided for controlling operations of members or sections which realize the facsimile function. The printer controller 44 is provided for controlling operations of members or sections which realize the printer function. The copy controller 45 is provided for controlling operations of members or sections which realize the copying function.

The facsimile communication section 36 includes an encoding/decoding portion (not illustrated), a modem (not illustrated), and an NCU (Network Control Unit: not illustrated). The facsimile communication section 36 sends image data of a document read by the document reading section 4 to other facsimile machine via a telephone line and an internet line, and receives image data as received from other facsimile machine. The encoding/decoding section compresses and encodes image data which is to be transmitted, and decompresses and decodes image data which is received. The modem modulates the compressed and encoded image data to audio signals, and demodulates received signals (audio signal) to image data. Further, the NCU controls a connection to a facsimile machine (receiving end) via a telephone line.

The network I/F section 37 uses a network interface (for example, 10/100base-TX) and the like to control transmission and receiving of various data with respect to a user's server connected via a network. Further, when one or a plurality of terminal devices such as personal computers and the like are connected to the network, the network I/F section 37 controls transmission and receiving of various data with respect to the terminal devices. For example, the network I/F section 37 sends document image data as read by the document reading section 4 to a terminal device, and receives image data from the terminal device to be subjected to the printing process in the image forming section 21.

The parallel I/F section 38 uses a high speed bidirectional parallel interface (for example, IEEE1284 compatible) or the like to receive print data from an external equipment or the like by means of a parallel transmission which transfers data of a plurality of bits via a plurality of signal lines. The serial I/F section 39 uses a serial interface (for example, RS-232C) or the like to receive various data from an external equipment by means of a serial transmission which sequentially sends data a bit by a bit using a single signal line.

The HDD 40 stores image data read by the document reading section 4 and image data received via networks, or an output format set for the image data. Other than being used in the complex machine 1, the image data stored in the HDD 40 is used in the terminal device, for example, to be confirmed by a terminal device or to be transferred to a predetermined folder of the terminal device via the network I/F section 37.

In the complex machine 1, various functions can be realized by combining the above-described functions. For example, a PC transmission function, an Email transmission function, a FAX transmission function, and the like may be realized as a scanner function. Here, the PC transmission function is a function of directly sending image data as read from a document to a desired terminal device via networks. The Email transmission function is a function of sending image data as read from a document directly to, for example, an unillustrated SMTP server via networks as an attached file of an electronic mail and sending the electronic mail from the SMTP server to a desired external terminal device via networks. The FAX transmission function is a function of directly sending image data read from a document to a desired facsimile and the like via a phone line or the like.

The controller 35 functions not only as the controllers 42 to 45, but also as image data receiving section 46, an image processing section 47, a background area calculating section 48, a determining section 49, a copy guard pattern detecting section 50, and a prohibiting section 51.

The image data receiving section 46 receives from a terminal device (not shown) such as a personal computer via the network I/F section 37, an image file including image data for use in forming a background image, and various information for use in forming a background pattern including instructions for executing the process of forming a background pattern using an image file.

The image processing section 47 executes various image processing operations including a predetermined correction process such as a level correction and a γ correction, a compression or decompression process, and an enlarging or reducing process with respect to image data as read by the document reading section 4 and the like. The image processing section 47 also stores the image data as processed in the image memory 51 and outputs the image data to the image forming section 21, the facsimile communication section 36, the network I/F section 37, or the like.

Further, the image processing section 47 is provided with a background pattern forming section 52 and a background pattern correcting section 53. The background pattern forming section 52 forms data indicative of a background pattern (hereinafter, referred to as background pattern data) by subjecting the image data to a predetermined process to form a background image in the image file as received by the image data receiving section 46. Further, the predetermined processes include a binary process, and conventional process such as an affine transformation process and an enlargement/reduction process, as necessary.

FIGS. 3A and 3B show background patterns showing the case where the background pattern data are formed on sheets. As shown in FIGS. 3A and 3B, the background patterns are made up of electrostatic latent image portions 54 and 56, and background portions 55 and 57 which are formed with different screen ruling.

Figure 5A:
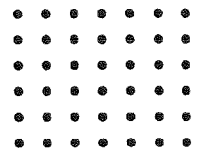
FIG. 5A shows a dot pattern which constitutes a latent image portion.
Figure 5B:
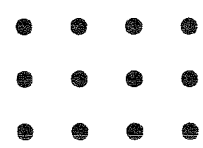
FIG. 5B shows a dot pattern which constitutes a background portion.

Specifically, as shown in FIGS. 5A and 5B, the screen ruling for forming the latent image portions 54 and 56 (refer to FIG. 5A) is (density of dots) higher than the screen ruling for forming the background portions 55 and 57 (refer to FIG. 5B), and the background portions 55 and 57 are formed to have dots which can be resolved by a reading operation executed in a normal image forming apparatus including the complex machine 1. On the other hand, the latent image portions 54 and 56 have dots which cannot be resolved by a reading operation executed in a normal image forming apparatus including the complex machine 1. Therefore, when a reading operation is performed with respect to a document having formed thereon the background pattern, a predetermined pattern normally appears on the document in an area of the latent image portion 54 and 56 in an outlined state.

The background pattern forming section 52 forms a background pattern so as to include a copy guard pattern which will be described below. The copy guard pattern is formed to prohibit a reproduction of a document (image forming operation with respect to a sheet) when detecting that copy guard pattern is present in the image data as obtained by reading a document image including the copy guard pattern.

As will be described later, the background pattern correcting section 53 performs the process of correcting the background pattern created by the background pattern forming section 52 under a certain condition.

The background area calculating section 48 calculates a size (area) of a background portion in the background pattern data formed by the background pattern forming section 52. In other words, for example, regarding the background pattern shown in FIG. 3A, the background area calculating section 48 calculates the size of the background portion 55. Further, for example, regarding the background pattern shown in FIG. 3B, the background area calculating section 48 calculates the size of the background portion 57. FIG. 3A shows an example of a background pattern in which the size (area) of the background portion 55 is relatively large. FIG. 3B shows an example of a background pattern in which the size (area) of the background portion 57 is relatively small.

The determining section 49 determines whether the size of the background portion calculated by the background area calculating section 48 is smaller than a predetermined threshold value. The threshold value is a minimum size at which the copy guard pattern which will be described hereinafter can be formed appropriately.

As shown in FIG. 3B, for example, when the determining section 49 determines that the size of the background portion is smaller than the threshold value (corresponding to the certain condition), the background pattern correcting section 53 corrects the background pattern created by the background pattern forming section 52.

Figure 4A:
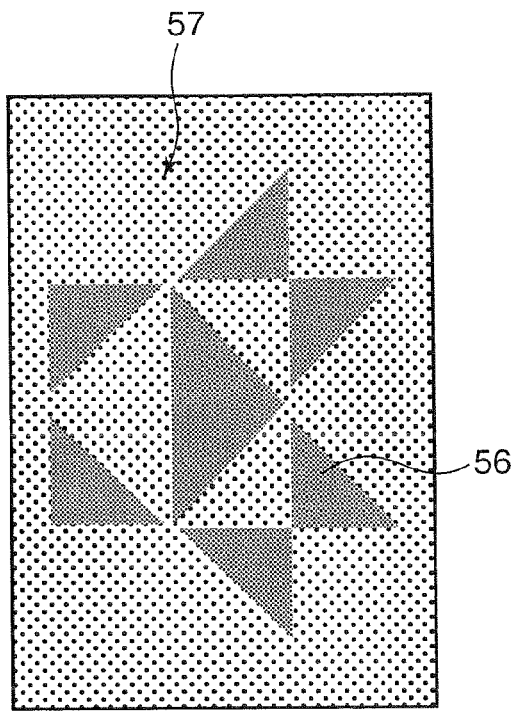
FIG. 4A shows a correction process to be executed by a background pattern correcting section.
Figure 4B:
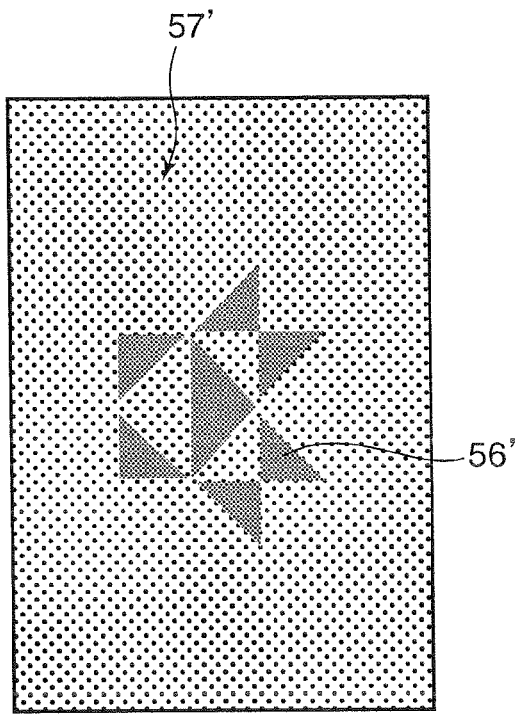
FIG. 4B shows a correction process to be executed by the background pattern correcting section.

If the background pattern formed by the background pattern forming section 52 is a background pattern shown in FIG. 4A (which is the same as the background pattern shown in FIG. 3B), the background pattern correcting section 53 determines a reduction rate such that the size of the background portion 57 in the background pattern shown in FIG. 4A becomes the threshold value as shown in FIG. 4B. Then, an overall size of the electrostatic latent image portion 56 in the background pattern formed by the background pattern forming section 52 is reduced at the above reduction rate, and the background pattern data indicative of the background pattern having the corrected electrostatic latent image portion 56' and background portion 57' is stored into the image memory 33. When performing a copying operation to form an image onto a sheet, the image forming section 21 reads the background pattern data from the image memory 33 and forms a document image with a background image onto a sheet in accordance with the background pattern data. The copy guard pattern detecting section 50 detects whether the image data as read by the document reading section 4 contains the data indicative of the copy guard pattern (hereinafter, referred to as copy guard pattern data).

When the copy guard pattern detecting section 50 detects the copy guard pattern data, the prohibiting section 51 outputs a prohibiting signal to the image forming section 21 for prohibiting the process of forming an image onto a sheet (reproducing an image). Upon receiving the prohibiting signal as received from the prohibiting section 51, an image forming operation is not performed by the image forming section 21.

Figure 6:
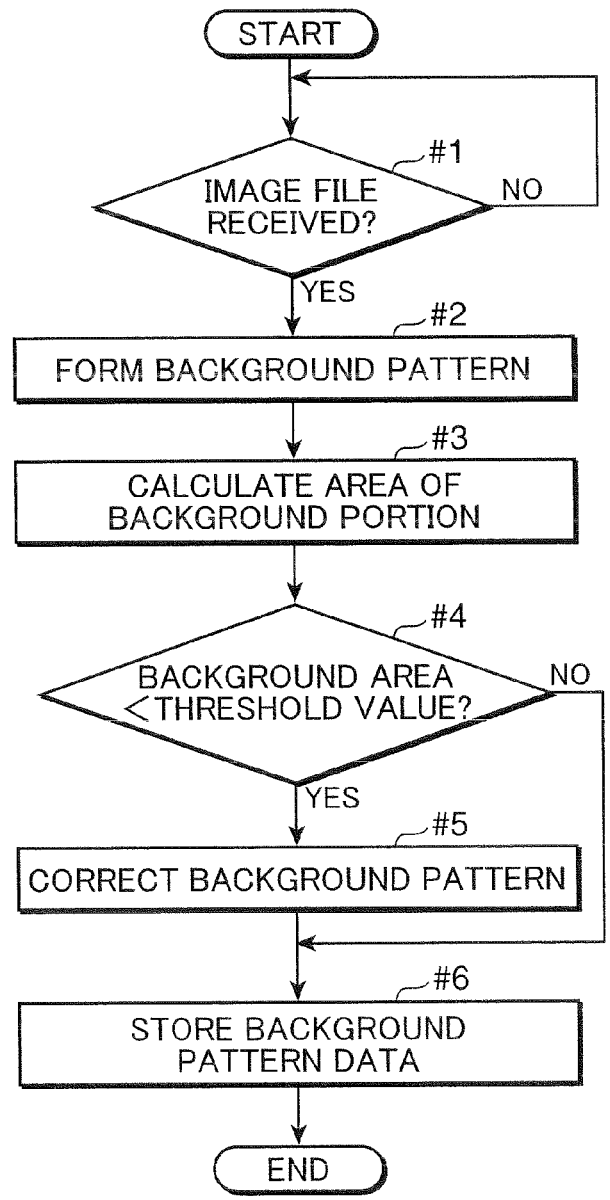
FIG. 6 is a flowchart showing the process of correcting a background pattern correction process in a complex machine.

FIG. 6 is a flowchart showing a background pattern correcting process to be carried out by the complex machine 1.

As shown in FIG. 6, when an image file for forming a background pattern is received from a terminal device such as a personal computer (YES in step #1), the controller 35 forms a background pattern in which a copy guide pattern is embedded using the image file as received (step #2).

Next, the controller 35 calculates the size (area) of the background portion 57 (refer to FIGS. 4A through 4C) of the created background pattern (step #3), and determines whether the size of the background portion 57 is smaller than the predetermined threshold value (step #4).

If it is determined that the size of the background portion 57 is smaller than the threshold value (YES in step #4), in order to secure a sufficient size to embed the copy guard pattern into the background portion 57, the controller 35 corrects the latent portion 56 to reduce its size so that the size of the background portion 57 in the background pattern formed in step #2 becomes the size corresponding to the threshold value (step #5). With this correction, a background pattern changes, for example, from the background pattern shown in FIG. 4A to the background pattern shown in FIG. 4B, and the copy guard pattern is embedded into the enlarged background portion 57. Then, the controller 35 stores the background pattern data as corrected into the image memory 33 (step #6).

On the other hand, if it is determined that the size of the background portion 57 is equal to or larger than the threshold value (NO in step #4), the routine skips the process of step #5 and executes the process of step #6 since the background portion 57 subjected to embedding of the copy guard pattern is large enough.

As described above, the copy guard pattern is embedded into the background pattern. Therefore, when a document image including the foregoing background pattern is read by a device with the copy guard pattern detection function, the device would be prohibited to reproduce an image (an image forming operation). Furthermore, even if the device reading the document image is not provided with such copy guard pattern detection function, since the background pattern would appear on a copy, an operator refrains from continuing a copying operation or a use of the copy.

Further, in the present embodiment, when the size of the background portion in the background pattern formed in accordance with the received image is smaller than the predetermined threshold value, an overall size of the latent image portion is reduced so that the size of the background portion becomes the size corresponding to the threshold value. Accordingly, the background portion can be made larger in size.

Accordingly, it is possible to ensure a sufficient size of the background portion for embedding therein the copy guard pattern, thereby securely forming the copy guard pattern in the background portion. As a result, when the reading operation is executed by an image forming apparatus with respect to a document image with the background portion containing the copy guard pattern, it is possible to form an arbitrary image on a sheet as a background pattern while surely preventing the reproduction of the document image (image forming operation) by the image forming apparatus.

The present invention is not intended to be limited to the foregoing embodiment, and, for example, the following modifications may be adopted.

[1] In the foregoing preferred embodiment, when the size of the background portion is smaller than the predetermined threshold value, the size of the background portion is adjusted to be the threshold value. However, it is not necessary that the size of the corrected background portion be adjusted to the threshold value, and may be adjusted to be larger than the threshold value. In foregoing preferred embodiment, the reduction rate of the latent image portion is set in the complex machine 1. However, the present invention is not intended to be limited to this structure, and, for example, the reduction rate input section 58 (refer to FIG. 2) for inputting a reduction rate of a latent image portion may be provided in the operating section 6, wherein an input by the reduction rate input section 58 is received if the reduction rate as inputted is within a range for the size of the background portion which is equal to or larger than the threshold value, and upon receiving the reduction rate within the above range by the reduction rate input section 58, the controller 35 executes the process of reducing the size of the latent image portion 56 at the reduction rate as inputted.

Figure 4C:
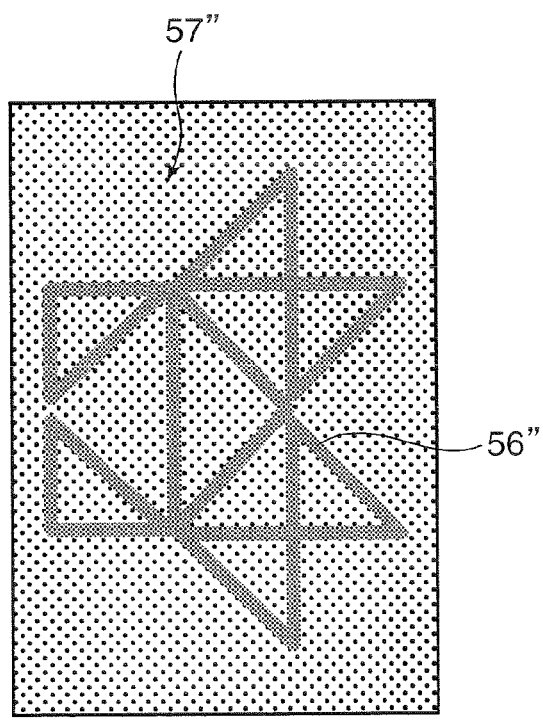
FIG. 4C shows a correction process to be executed by the background pattern correcting section.

[2] In the foregoing preferred embodiment, the process of reducing an overall size of the latent image portion is adopted as the process for adjusting the size of the background portion to be equal to or larger than the threshold value when the size of the background portion is smaller than the predetermined threshold value. However, the present invention is not intended to be limited to the foregoing structure, and, alternately, for example, as shown in FIG. 4C, the process of forming a new background pattern may be adopted wherein an edge portion (contour portion) from the latent image portion 56" is extracted, only the edge portion as extracted is defined to be a latent image portion, while defining other portions than the edge portion to be a background portion 57".

Furthermore, the present invention is not intended to be limited to adopt the foregoing process of newly creating a background pattern by reducing the latent image portion 56, or the process of extracting the edge portion (contour portion) of the latent image portion 56, and defining the edge portion as extracted to be the latent image portion. For the process of correcting the background pattern by the background pattern correcting section 53, it is preferable to adopt a process which permits the design for a background image to be retained.

[3] As means for inputting an image file to the complex machine 1, the complex machine 1 in accordance with the foregoing preferred embodiment has the function of receiving an image file including image data for use in forming a background image from a terminal device such as a personal computer. However, the present invention is not intended to be limited to this structure. It may be arranged, for example, such that a background pattern is formed using image data obtained by reading by the document reading section 4 the document having formed thereon an image for use in forming a background image, or may be arranged a background image is formed using the data as read from a CD-ROM or other recording medium installed in the complex machine 1, as the data for use in forming a background pattern.

The embodiment described above includes the invention having the following configuration.

An image forming apparatus according to one aspect of the present invention includes: an image forming section for forming an image on a sheet; a data receiving section for receiving image data for use in forming a background pattern as inputted to the image forming apparatus; a background pattern forming section for forming a background pattern which includes a background portion formed with a first screen ruling and a latent image portion formed with a second screen ruling which is higher than the first screen ruling in accordance with the image data for use in forming the background pattern as received by the data receiving section, with a copy prohibiting pattern embedded in the background portion; a determining section for determining if a value indicative of a size of the background portion in the background pattern formed by the background pattern forming section is smaller than a predetermined threshold value; and a background pattern correcting section which corrects, when the determining section determines that the value indicative of the size of the background portion is smaller than the threshold value, the background portion and the latent image portion so that the value indicative of the size of the background portion becomes equal to or larger than the threshold value, and which forms a background pattern having a corrected background portion in which a copy prohibiting pattern is embedded, wherein the image forming section forms on a sheet the background pattern as formed by the background pattern correcting section when the determining section determines that the value indicative of the size of the background portion is smaller than the threshold value, and forms on the sheet the background pattern as formed by the background pattern forming section when the determining section determines that the value indicative of the size of the background portion is equal to or larger than the threshold value.

According to the foregoing structure, it is determined whether the value indicative of the size of the background portion in the background pattern as formed by the background pattern forming section is smaller than the predetermined threshold value. When it is determined that the value indicative of the size is smaller, the background portion and the latent image portion are corrected so that the value indicative of the size of the background portion becomes equal to or larger than the threshold value. With this structure, it is possible to increase a size of the background portion in which a copy prohibiting pattern is to be embedded. As a result, for such copy prohibiting pattern representing a certain pattern, it is possible to prevent or reduce an occurrence of such problem that each pattern as formed is partially missing or a predetermined number of copy prohibiting patterns in a the background portion of a piece of document.

It is preferable that the foregoing structure be arranged such that when the determining section determines that the value indicative of the size of the background portion is smaller than the threshold value, the background pattern correcting section reduces an overall size of the latent image portion in the background pattern as formed by the background pattern forming section so that the value indicative of the size of the background portion becomes equal to or larger than the threshold value, and forms a background pattern in which the copy prohibiting pattern is embedded in the background portion after having being reduced in size.

According to the foregoing structure, an overall size of the latent image portion is reduced in the background pattern as formed by the background pattern forming section so that the background portion in which the copy prohibiting pattern is to be embedded becomes larger in size. In this way, it is possible to increase the size of the background portion with a relatively simple process.

It is preferable that the foregoing structure be further arranged such that a change input section for inputting a change in size of the background portion in the background pattern as formed by the background pattern forming section, wherein when the size of the background portion as inputted by the change input section is equal to or larger than the threshold value, the background pattern correcting section changes the background pattern as formed by the background pattern forming section so that the size of the background portion in the background pattern as formed by the background pattern forming section becomes equal to the size of the background portion as inputted by the change input section, and forms a background pattern in which the copy prohibiting pattern is embedded in the background portion having being changed.

According to the foregoing structure, it is possible for a user to set the size of the background portion within the range of the size equal to or larger than the threshold value.

It is preferable that the foregoing structure be arranged such that when the determining section determines that the value indicative of the size of the background portion is smaller than the threshold value, the background pattern correcting section extracts an edge portion of the latent image portion from the background pattern as formed by the background pattern forming section, and forms a background pattern in which only the edge portion as extracted is defined to be a latent image portion.

According to the foregoing structure, an edge portion in the latent image portion is extracted from the background pattern as formed by the background pattern forming section, and the background pattern is formed in which only the edge portion as extracted is defined to be a latent image portion so that the background portion in which the copy prohibiting pattern is to be embedded becomes larger in size. In this way, it is possible to increase the size of the background portion with ease by using conventional edge detection techniques.

The foregoing structure may be arranged so as to further comprise an image reading section for reading a document image; a detecting section which detects if data indicative of a copy prohibiting pattern is included in image data as read by the image reading section, and a prohibiting section which prohibits the image forming section from executing an image forming operation with respect to the image data when the detecting section detects the data indicative of the copy prohibiting pattern.

According to the foregoing structure wherein the detecting section and the prohibiting section are provided, an unfair copying operation can be prevented.

This application is based on Japanese Patent application serial No. 2007-229003 filed in Japan Patent Office on Sep. 4, 2007, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An image forming apparatus, comprising:
   an image forming section for forming an image on a sheet;
   a data receiving section for receiving image data for use in forming a background pattern as inputted to the image forming apparatus;
   a background pattern forming section for forming a background pattern which includes a background portion formed with a first screen ruling and a latent image portion formed with a second screen ruling which is higher than the first screen ruling in accordance with the image data for use in forming the background pattern as received by the data receiving section, with a copy prohibiting pattern embedded in the background portion;
   a determining section for determining if an area of the background portion occupied in the background pattern formed by the background pattern forming section is smaller than a predetermined threshold value; and
   a background pattern correcting section which corrects, when the determining section determines that the area of the background portion is smaller than the threshold value, the background portion and the latent image portion so that the area of the background portion becomes equal to or larger than the threshold value by reducing the latent image portion while maintaining the second screen ruling, and which forms a background pattern having a corrected background portion in which a copy prohibiting pattern is embedded,
   wherein the image forming section forms on a sheet the background pattern as formed by the background pattern correcting section when the determining section determines that the area of the background portion is smaller than the threshold value, and forms on the sheet the background pattern as formed by the background pattern forming section when the determining section determines that the area of the background portion is equal to or larger than the threshold value.

2. The image forming apparatus according to claim 1, wherein when the determining section determines that the area of the background portion is smaller than the threshold value, the background pattern correcting section reduces an overall size of the latent image portion while maintaining the second screen ruling in the background pattern as formed by the background pattern forming section so that the area of the background portion becomes equal to or larger than the threshold value, and forms a background pattern in which the copy prohibiting pattern is embedded in the background portion after having being reduced in size.

3. The image forming apparatus according to claim 1, further comprising:
   a change input section for inputting a change in size of the background portion in the background pattern as formed by the background pattern forming section,
   wherein when the size of the background portion as inputted by the change input section is equal to or larger than the threshold value, the background pattern correcting section changes the background pattern as formed by the background pattern forming section while maintaining the first screen ruling and the second screen ruling so that the size of the background portion in the background pattern as formed by the background pattern forming section becomes equal to the size of the background portion as inputted by the change input section, and forms a background pattern in which the copy prohibiting pattern is embedded in the background portion having being changed.

4. The image forming apparatus according to claim 2, further comprising:
   a change input section for inputting a change in size of the background portion in the background pattern as formed by the background pattern forming section,
   wherein when the size of the background portion as inputted by the change input section is equal to or larger than the threshold value, the background pattern correcting section changes the background pattern as formed by the background pattern forming section while maintaining the first screen ruling and the second screen ruling so that the size of the background portion in the background pattern as formed by the background pattern forming section becomes equal to the size of the background portion as inputted by the change input section, and forms a background pattern in which the copy prohibiting pattern is embedded in the background portion having being changed.

5. The image forming apparatus according to claim 1, wherein
   when the determining section determines that the value indicative of the size of the background portion is smaller than the threshold value, the background pattern correcting section extracts an edge portion of the latent image portion from the background pattern as formed by the background pattern forming section, and forms a background pattern in which only the edge portion as extracted is defined to be a latent image portion with the second screen ruling.

6. The image forming apparatus according to claim 1, further comprising:
   an image reading section for reading a document image;
   a detecting section which detects if data indicative of a copy prohibiting pattern is included in image data as read by the image reading section, and
   a prohibiting section which prohibits the image forming section from executing an image forming operation with respect to the image data when the detecting section detects the data indicative of the copy prohibiting pattern.

7. The image forming apparatus according to claim 1, wherein the background pattern correcting section reduces only the latent image portion while maintaining the second screen ruling when the determining section determines that the area of the background portion is smaller than the threshold value.

* * * * *